United States Patent Office 3,787,406
Patented Jan. 22, 1974

3,787,406
TRIAZINYL VAT DYESTUFFS
Paul Ulrich and Max Staeuble, Basel, Fritz Kugler, Muttenz, and Max Jost, Oberwil, Basel-Land, Switzerland, assignors to Ciba-Geigy AG, Basel, Switzerland
No Drawing. Filed Apr. 16, 1970, Ser. No. 29,255
Claims priority, application Switzerland, Apr. 24, 1969, 6,356/69
Int. Cl. C07d 55/20
U.S. Cl. 260—249          5 Claims

ABSTRACT OF THE DISCLOSURE

The invention relates to vat dyestuff of the general formula

     (1)

wherein A denotes a vattable radical, X denotes a heterocyclic radical having three ring nitrogen atoms which is bounded to the —NH— group by a ring carbon atom, Y denotes an oxygen or sulphur atom, R denotes an aromatic radical free from azo groups which is bounded to the oxygen or sulphur atom Y by a carbon atom of the aromatic nucleus, which, when R represents a heterocyclic aromatic radical is an at least 6-membered heterocyclic aromatic radical, and Z denotes a radical

—NH—A' or a radical —Y—A', wherein Y has the above-mentioned significance and A' represents a vattable residue which are valuable dyestuffs for vat and pigment dyeing. The dyeings obtained are distinguished by very clear shades, interesting application properties and very good properties of wet fastness and fastness to light.

---

The present invention provides new vat and pigment dyestuffs of the general formula

     (1)

wherein A denotes a vattable radical, X denotes a heterocyclic radical having three ring nitrogen atoms which is bound to the —NH— group by a ring carbon atom, Y denotes an oxygen or sulphur atom, R denotes an aromatic radical free from azo groups which is bounded to the oxygen or sulphur atom Y by a carbon atom of the aromatic nucleus, in which, when R represents a heterocyclic aromatic radical is an at least 6-membered heterocyclic aromatic radical, and Z denotes a radical

—NH—A' or a radical —Y—A', wherein Y has the abovementioned significance, and A' represents a vattable residue.

The following restrictions (a) and (b) however apply:

(a) When Z represents a group —NH—A', A as well as A' and X have the abovementioned general significance, R represents a phenyl radical and Y is an oxygen atom, then R is a phenyl radical which contains substituents which confer solubility in water, or a phenyl radical which is substituted by radicals which in total have a molecular weight of above 138, or a phenyl radical having more than 8 carbon atoms, but the restrictions mentioned do not apply when A represents a methoxyanthraquinone radical or an anthraquinone radical which contains halogen atoms.

(b) When Y represents a sulphur atom, R represents an unsubstituted α-naphthyl radical and Z represents a radical —NH—A', then A and A' must not represent an unsubstituted anthraquinonyl-(2) radical.

Suitable vattable radicals A and A' are radicals of polycyclic quinones, for example indanthrones, pyranthrones, and dibenzanthrones, but particularly radicals of phthaloylacridones and especially anthraquinones.

Suitable heterocyclic radicals X are both simple ring compounds and also heterocyclic compounds which contain fused rings. Dyestuffs of Formula 1 in which the radical X represents a 1,3,5-triazine radical are of particular interest.

The aromatic radical R preferably represents a benzene, naphthalene or anthraquinone radical.

The radicals R can be substituted in the aromatic nuclei having regard to the abovementioned restrictive conditions when R represents a phenyl or naphthyl radical. Suitable radicals R however also include heterocyclic aryl radicals or aryl radicals having fused heterocyclic rings, but R must not contain an azo group.

When Z in Formula 1 denotes a group —NH—A', the radicals A and A' can be identical or different, but preferably the dyestuffs contain identical radicals A and A', especially anthraquinone radicals. The anthraquinone radicals can be bound to the —NH— bridge in the 1- or 2-position. Valuable dyestuffs are those which contain the radical of a methoxyanthraquinone, for example of 1-amino-4-methoxyanthraquinone, or the radical of a halogenated anthraquinone, for example 1-amino-2-, -3- or -4-chloroanthraquinone or 2-amino-3- or -4-chloroanthraquinone, especially those of the general formula (2)
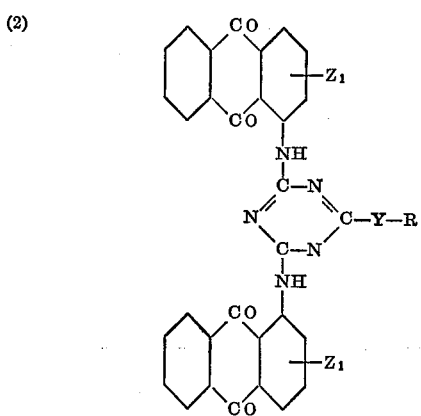

wherein Y has the abovementioned significance, $Z_1$ represents a halogen atom, and R denotes a benzene radical which can be substituted by halogen atoms, hydroxyl or carboxyl groups or alkyl, aryl, aralkyl, carboxylic acid amide or carbalkoxy radicals, or a heterocyclic radical or an anthraquinone radical. As dyestuffs of this type, those of the following formulae may for example be mentioned:

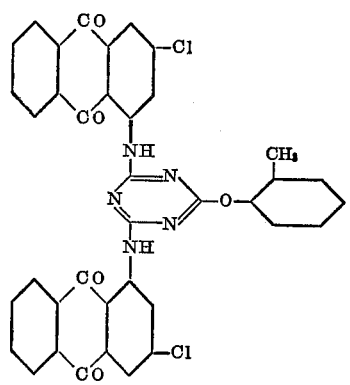

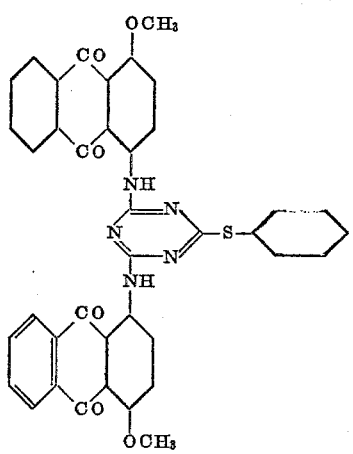

Important dyestuffs are also those of Formula 1 which as radicals A and A' preferably contain identical unsubstituted anthraquinone radicals, for example dyestuffs of Formula 2, wherein $Z_1$ represents a hydrogen atom, having regard to the restrictions mentioned above. Important dyestuffs are also those which contain the radical of an acylated anthraquinone, for example 1-amino-4- or -5-benzoylaminoanthraquinone, or dyestuffs which contain two identical radicals of the type mentioned, especially dyestuffs of the general formula (3) 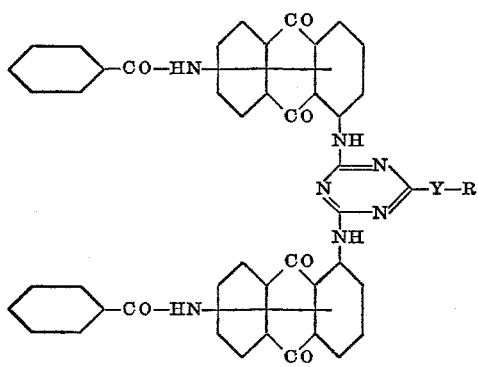

wherein Y and R have the significance indicated for Formula I.

Amongst the groups conferring solubility in water mentioned in the restrictive conditions, hydroxyl groups, but particularly carboxylic acid and sulphonic acid groups, are for example to be understood. As phenyl radicals which are substituted by radicals which in total have a molecular weight of above 138 but contain less than nine carbon atoms, halogenated phenyl radicals, for example the pentachlorophenyl radical, may be mentioned. Amongst phenyl radicals having more than eight carbon atoms, there are to be understood either aliphatically or aromatically substituted phenyl radicals, and also phenyl radicals which contain further fused rings, for example a naphthyl radical or an anthraquinonyl radical. An at least 6-membered heterocyclic aromatic radical is to be understood to be a radical which is either a heterocyclic aromatic system, for example a triazine ring (1,3,5) or a heterocyclic radical which contains a fused aromatic radical, for example a coumarin radical. Here again the radical can be substituted.

As examples of the abovementioned dyestuffs which contain two identical unsubstituted anthraquinone radicals or benzoylaminoanthraquinone radicals, and which at the same time come under the restrictions mentioned under (a), the dyestuffs of the following formulae may be mentioned:

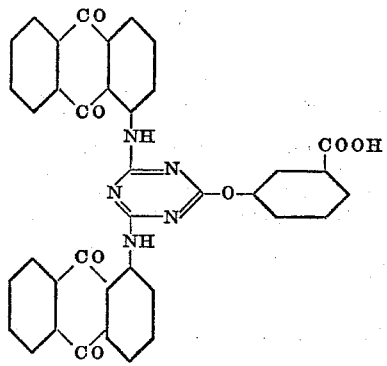
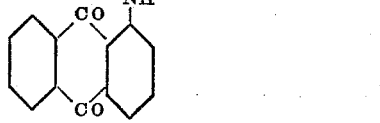

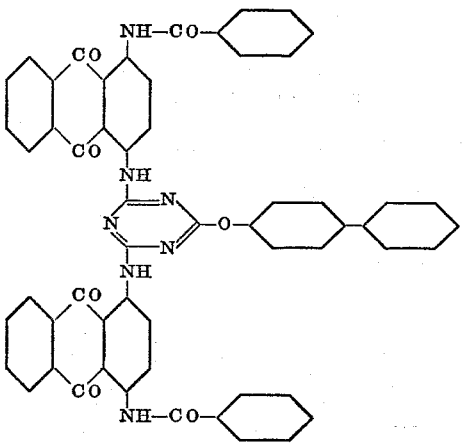
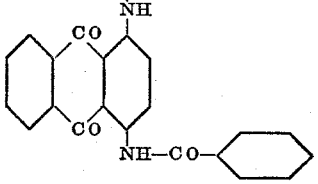

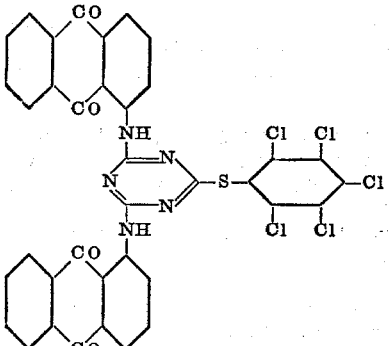

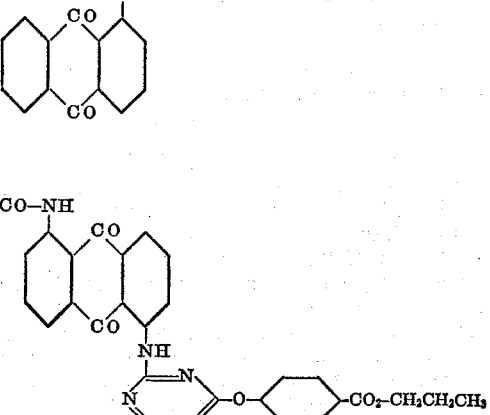
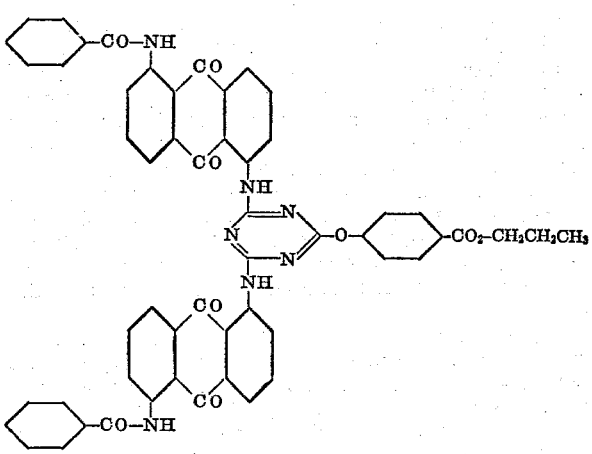

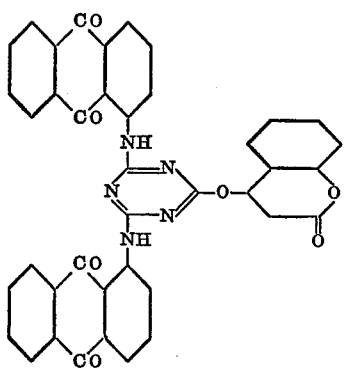

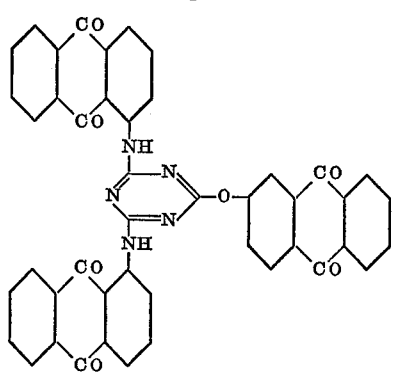

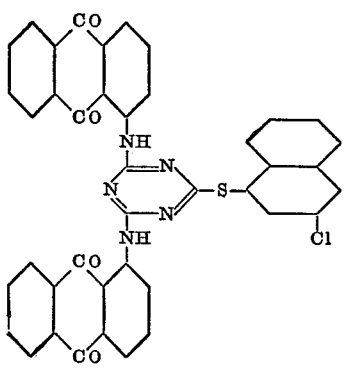

When Z in the General Formula 1 represents a radical —Y—A', wherein Y denotes an oxygen or sulphur atom, A, A' and R art not subject to any restrictive conditions. As an example of such a dyestuff, the dyestuff of the following formula may be mentioned:

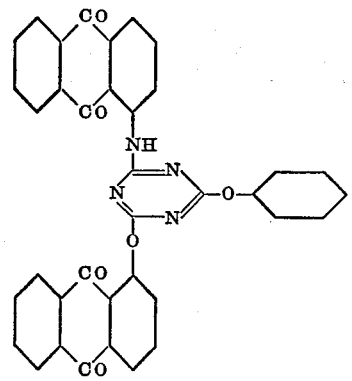

Further dyestuffs which must be especially mentioned are those in which A, A' and R each represents an anthraquinone radical, for example, the dyestuff of the formula

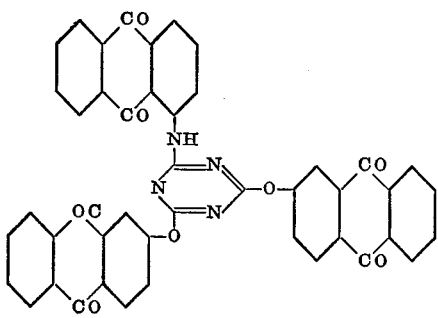

The manufacture of the dyestuffs of Formula 1 according to the invention can be carried out in known manner by condensation of heterocyclic compounds having three ring nitrogen atoms and containing at least two easily removable substituents, for example methanesulphonyl groups or halogen atoms, with polycyclic quinones which contain groups capable of condensation, for example an amino group, and with aromatic hydroxyl or mercapto compounds. As further substituents, the heterocyclic compounds can for example contain alkyl or aryl radicals, amino groups, for example alkylamino groups, arylamino groups or an $H_2N$-group, etherified hydroxyl or mercapto groups, for example alkoxy groups, alkyl- or aryl-mercapto groups, and nitro, cyano or ClCO-groups. After the manufacture of the dyestuffs of Formula 1, further substituents can be introduced into the radicals A, A' and R, or substituents present in these can be removed.

As heterocyclic compounds which are suitable for the manufacture of the dyestuffs according to the invention, the following may be mentioned: 3,5,6-trichloro-1,2,4-triazine, 2,4,6-trifluoro-1,3,5-triazine and especially 2,4,6-trichloro-1,3,5-triazine or 2,4,6-tribromo - 1,3,5 - triazine, 2,4,6-trimethanesulphonyl-1,3,5-triazine, and 4,6-dichloro-1,3,5-triazines which are substituted in the 2-position by an aryl or alkyl radical, for example a phenyl, methyl or ethyl radical, or by the radical of an aliphatic or aromatic mercapto compound bound through the sulphur atom or a hydroxyl compound bound through the oxygen atom, or especially by an amino group or by the radical of an aliphatic, heterocyclic or aromatic amino compound bound through the nitrogen atom.

As hydroxyl or mercapto compounds which are suitable for the manufacture of the dyestuffs of Formula 1, the following may be mentioned:

2-hydroxynaphthalene,
pentachlorothiophenol,
1-hydroxy-4-phenylbenzene,
1-hydroxy-3-methyl-6-isopropylbenzene,
1,2-dihydroxy-4-(1,1-dimethylethyl)-benzene,
1-hydroxy-2-methyl-4,6-dichlorobenzene,
1-hydroxy-4-nitrobenzene, 1-hydroxy-2-chloro-4,6-dinitrobenzene,
1-hydroxy-2,4,6-trichlorobenzene,
1-hydroxy-4-methoxybenzene,
o-, m- and p-cresol,
xylenols,
o- and p-chlorophenol,
salicylic acid,
1-hydroxybenzene-4-carboxylic acid,
2-hydroxynaphthalene-3-carboxylic acid,
1-hydroxybenzene-4-sulphonic acid,
1-hydroxy-2-chlorobenzene-4-sulphonic acid,
2-phenylethylalcohol,
pentachlorophenol,
1-hydroxy-2-phenylbenzene,
1-hydroxy-3-(4-methylphenylamino)benzene, 1-hydroxy-4-carbopropoxybenzene,
4-hydroxycoumarin,
8-hydroxyquinoline,
2-hydroxyanthraquinone,
2-mercaptoanthraquinone,
2-mercaptonaphthalene,
1-hydroxy-4-(4-methylphenylsulphonamido)-
anthraquinone,
1-hydroxy-2-isopropyl-4-chloro-5-methylbenzene,
1-hydroxy-2-chloro-4-phenylbenzene,
1-mercapto-2-carboxybenzene,
1-hydroxy-2,3,5-trimethylbenzene,
hydroxybenzene,
1-hydroxy-4-(anthraquinonyl(1)-aminocarbonyl)-
benzene, and also polyfunctional hydroxyl or mercapto compounds having at least two hydroxyl groups which can undergo condensation, cyclic compounds having a glucoside linkage, but especially aromatic or heterocyclic compounds which contain at least two hydroxyl groups having mobile hydrogen atoms, for example dihydroxybenzenes and trihydroxybenzenes, for example resorcinol, hydroquinone and their substitution products, phloroglucinol, pyrogallol and substitution products, dihydroxydiphenyl derivatives, dihydroxynaphthalenes or naphthaquinones, for example 1,4-dihydroxynaphthalene or naphthazarine, dihydroxyanthracenes, for example rufol (1,5), chrysazole (1,8), dihydroxychrysene, dihydroxyanthraquinones and their substitution products, for example quinizarine (1,4), anthrarufin (1,5), chrysazine (1,8), purpurin (1,2,4-tri), flavorpurpurin (1,2,6-tri), anthrapurpurin (1,2,7-tri), polyhydroxyl compounds for example hexosene, cellobiose and cellulose, and especially polyhydroxyanthraquinones, for example 1,2,5,8-tetrahydroxyanthraquinone (=Alizarin Claret) 1,2,4,5,6,8-hexahydroxyanthraquinone (=Anthracene Blue), dihydroxyindanthrone, dihydroxybenzanthrone, dihydroxyisodibenzanthrone, dihydroxydiphenyl-perylene-tetracarboxylic acid diimide or, for example, compounds of the formulae

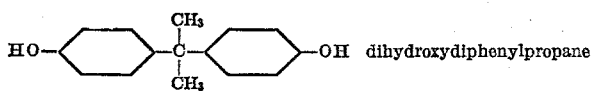 dihydroxydiphenylpropane

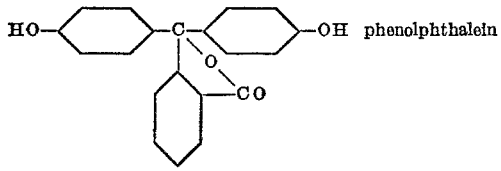 phenolphthalein

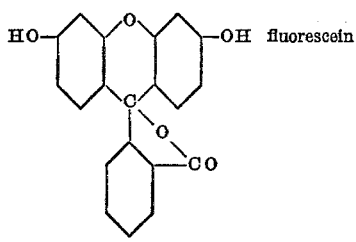 fluorescein

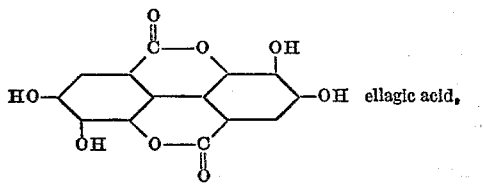 ellagic acid, 1,3- 1,4- and 1,5-dihydroxynaphthalene, 2,6-dihydroxytoluene, di- or tri-hydroxy- or mercapto-heterocyclics, for example 2-phenyl-4,6-dihydroxytriazine, 2,4,6-trihydroxypyrimidine, 2,4,6-trihydroxytriazine, 3,6-dihydroxypyridazine, 1,4-dihydroxyphthalazine, 1,3-dihydroxyquinazoline, 2,3 - dihydroxyquinoxaline, 2,5 - dimercapto-1,3,4-thiadiazole, 3,6 - dihydroxy - 1,2,4-trimethylbenzene, 4-methyluracil, di-β-naphthol, tetrahydroxy-diphenyl, and trihydroxybenzoic acid.

Instead of a dihydroxy or dimercapto compound those compounds which contain both a hydroxyl and a mercapto group may also be used, for example 2-mercapto-4-hydroxypyrimidine, 2-thiouracil or 4-methylthiouracil.

Amongst the polycyclic quinones, those which can be vatted are particularly important. In order to manufacture the dyestuffs according to the invention, quinones which contain substituents capable of condensation, for example primary or secondary amino groups, may be reacted in known manner with the abovementioned compounds which contain easily removable substituents, for example halogen atoms. The term vattable quinone comprises those chromophores which may be converted by reduction into a so-called leuco-form or vat which has a better affinity for natural or regenerated cellulose fibres than the non-reduced form, and which can be re-converted by oxidation into the original chromophoric system. Thus no polycyclic quinones of the type of 1-amino-4-arylaminoanthraquinone-2-sulphonic acid are used in the present process, because although these can be reduced they are so strongly modified chemically by the reduction that they can no longer be converted into the original chromophoric system. As examples of vattable compounds the following may be mentioned: naphthalenetetracarboxylic acid imides, polycyclic quinones, for example perylenetetracarboxylic acid imides, especially the phenylimides, anthrapyrimidines, anthrapyridones, isothiazoleanthrones, quinazolineanthraquinones, oxazoleanthraquinones, thiazolanthraquinones, oxdiazoleanthraquinones, anthraquinonyltriazoles, pyrazoleanthraquinones, dipyrazoleanthronyls, pyrazinoanthraquinones, azabenzanthrones, indanthrones, thioxanthonanthraquinones, anthrimides, anthrimidecarbazoles, dihydroacridines, anthanthrones, pyranthrones, dibenzpyrenequinones, dibenzanthrones, isodibenzanthrones, flavanthrones, acedianthrones and especially anthraquinoneacridones and the anthraquinones themselves, whereby there are to be understood not only derivatives having pure 9,10-dioxoanthracene rings, but also those having thiophanthrone radicals and the like, as well as anthraquinone compounds having 9,10-dioxoanthracene rings which can contain the customary substituents, for example halogen atoms, alkoxy groups, alkyl groups, sulphonic acid amide groups, sulphone groups and acylamino groups and if desired further fused and condensed-on carbocyclic and heterocyclic rings. As examples of suitable quinones which contain amino groups which can be condensed, the following may be mentioned:

1-amino-2-chloroanthraquinone,
1-amino-3-chloroanthraquinine,
2-amino-3-chloroanthraquinone,
1-amino-5-chloroanthraquinone,
2-amino-4-chloroanthraquinone,
1-amino-4-chloroanthraquinone,
1-amino-6-chloroanthraquinone,
1-amino-8-chloroanthraquinone,
1-amino-3-chloro-6-methylanthraquinone,
1-amino-6,7-dichloroanthraquinone,
1-amino-4-benzoylaminoanthraquinone,
1-amino-4-methoxyanthraquinone,
2-amino-3,4-phthaloylacridones,
1,4-diamino-2-acetylaminoanthraquinone,
aminoanthrapyrimidines,
1-aroylamino-4- or -5-aminoanthraquinone,
1,4-diamino-2-acetylanthraquinone,
1-amino-7-chloroanthraquinone,
1-amino-2-methyl-3-chloroanthraquinone,
4-aminoanthraquinone-2,1(N)-acridones, 4,4'-, 4,5'- or 5,5'-diamino-1,1'-dianthrimidecarbazole,
aminopyranthrones,
mono- and di-aminoacedianthrone,
aminoisodibenzanthrone,
aminodibenzanthrone,
aminoanthranthrone,
aminoflavanthrone,
aminopyranthrone,
amino-isothiazoleanthrones,
4-, 5- or 8-amino-1,1'-dianthrimidecarbazole,
aminoindanthrones,
4- or 5-amino-5'-benzoylamino-dianthrimidecarbazole,
4-amino-4'-benzoylamino-dianthrimidecarbazole,
aminodibenzpyrenequinone, and also
mono- and di-aminotrianthrimidecarbazoles, for example 8',8''-diamino-1',1,4,1''-trianthrimidecarbazole, as well as perylene tetracarboxylic acid di(p- or m-aminophenyl)-amide and naphthalene tetracarboxylic acid diimides, as well as compounds of the formulae

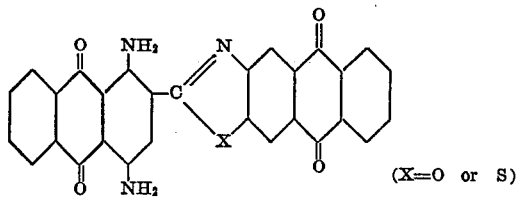

(X=O or S)

and

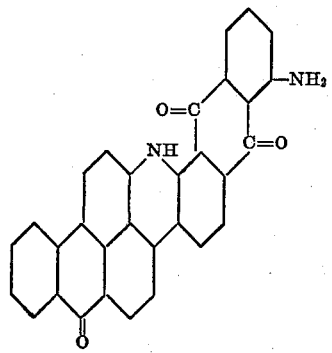

and those of the formula

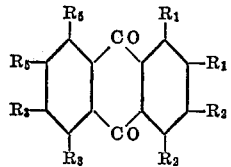

wherein one of the symbols $R_1$ represents a hydrogen atom and the other represents a grouping of the formula

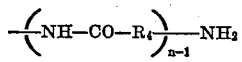

$n=1$ of 2, one of the symbols $R_2$, $R_3$ and $R_5$ represents a halogen atom, an alkoxy, aryloxy, arylmercapto or acylamino group, especially a benzoylamino group, for example a chloro-, methyl-, sulphon- or fluorobenzoylamino groups or an unsubstituted $C_6H_5$—CO—group, and each of the other symbols $R_1$, $R_3$ and $R_5$ represents a hydrogen or halogen atom, one of the pairs of symbols $R_2R_2$, $R_3R_3$ or $R_5R_5$ together being able to represent a grouping of the formula

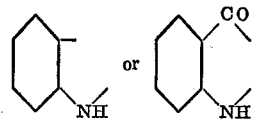

$R_4$ denoting an arylene radical preferably of the benzene series, and the compound of the formula

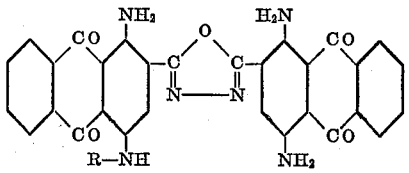

wherein R can be a benzoyl group or a hydrogen atom.

The reaction of the heterocyclic compounds with the hydroxyl or mercapto compounds and the polycyclic quinones can take place in any desired sequence.

Thus, for example, the hydroxyl or mercapto compound can first be reacted with the reactive heterocyclic compound and the resulting product subsequently reacted with the vattable compound. The heterocyclic compound may also be first reacted with the vattable compound and the reaction product subsequently condensed with the hydroxyl or mercapto compound. Advantageously, however, the reaction with the hydroxyl or mercapto compound of the radical R takes place last. The condensation with the vattable quinone is advantageously carried out under warm conditions.

The condensation reactions may be advantageously carried out in an inert solvent if desired in the presence of an acid-binding agent, for example sodium carbonate, sodium acetate, dimethylformamide or, advantageously, a tertiary amine, preferably pyridine.

Depending on the type and sequence of the reactions, suitable media are aqueous systems (for example water/acetone) or organic solvents, for example nitrobenzene, dichlorobenzenes or trichlorobenzenes, dimethylaniline, N-methylpyrrolidone, pyridine and the like, or phenol.

When 2,4,6-trichloro-1,3,5-triazine is used as the heterocyclic compound, the process is advantageously carried out in a high-boiling solvent, for example nitrobenzene, o-dichlorobenzene, naphthalene or phenol, since the third substituent in the triazine radical is occasionally difficult to replace. Reaction temperatures of above 100° are advantageously chosen. The replacement of the third substitutent in the triazine ring can also be facilitated by the addition of small amounts of an aromatic sulphonic acid, for example, benzene sulphonic, p-toluene sulphonic or especially m-nitrobenzene sulphonic acid.

The dyestuffs according to the invention can also be manufactured by choosing as starting substances the corresponding halogen compounds instead of chromophores containing amino groups (for example chloroanthraquinone instead of aminoanthraquinone) and reacting these with aminotriazines before or after the condensation with the hydroxyl or mercapto compounds. The manufacture can also take place by reacting triazines which contain removable substituents, for example halogenotriazines, with hydroxyl or mercapto compound in a molar ratio of 1:1 and, after subsequent replacement of two removable substituents of the triazine by amino groups, condensing with vattable polycyclic aromatic compounds which contain removable substituents, for example halogenoanthraquinones. Valuable mixed shades can be obtained by combining two different vattable compounds. When the vattable compound carries at least two amino groups and the reaction is carried out with a heterocyclic compound which also contains at least two substituents capable of condensation, dimeric or polymeric dyestuffs can also be obtained.

It can be advantageous to pass a stream of air or nitrogen through the reaction mixture periodically or during the whole reaction. The dyestuffs according to the invention can also contain sulphonic acid groups. Products which have a better affinity for the fibre are occasionally obtained when dyestuffs free from sulphonic acid groups are subsequently sulphonated according to one of the customary processes.

The dyeings obtained with the dyestuffs according to the invention are distinguished by vivd clear shades. Their advantageous application properties should be particularly mentioned. According to the present process, dyestuffs are obtained inter alia of which the application thereof is largely independent of temperature. The application can be effected according to the most diverse processes, for example according to the exhaustion process or the pad dyeing process, for example the pad-jig process, the pad-steam process or the cold dwell process. It is equally noteworthy that in all application processes good dyestuff yields are obtained and that a large proportion of the dyestuffs can be synthesized in almost theoretical yield according to the process of the invention. A particular advantage is that the range of the color shades obtainable is very great so that practically all shades can be produced with the dyestuffs according to the invention.

The products obtained in accordance with the process are suitable for dyeing and printing the most diverse materials, especially for dyeing and printing fibres of natural and regenerated cellulose in the presence of reducing agents, for example dithionite. The resulting dyeings are distinguished by very good properties of wet fastness, especially fastness to boiling with sodium carbonate and fastness to chlorine, as well as by good to very good fastness to light.

The new dyestuffs can also be used as pigments. As a result of their advantageous properties they can be employed for the most diverse pigment applications, for example in a finely divided form for dyeing rayon and viscose or cellulose ethers or esters or polyamides or polyurethanes or polyesters in the spinning composition and also for the manufacture of colored lacquers or lacquer-forming agents, solution or products of acetylcellulose, nitrocellulose, natural resins or synthetic resins, for example polymerization resins or condensation resins, for example aminoplasts, alkyd resins, phenoplasts, polyolefines, for example polyethylene, polypropylene, polystyrene, polyvinyl chloride, polyacrylonitrile, rubber, casein, silicone and silicone resins. They can also be advantageously employed in the manufacture of crayons, cosmetic preparations or laminated sheets.

In the examples which follow the parts, denote parts by weight and the percentages denote percentages by weight unless otherwise stated. The symbol Cy denotes a radical of the formula

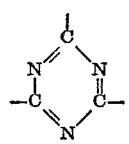

EXAMPLE 1

6.3 parts of the reaction product of 1 mol of cyanuryl chloride and 2 mols of 1-amino-3-chloro-anthraquinone in 120 parts of nitrobenzene are heated to 205–210° C. together with 1.7 parts of 2-naphthol with the addition of 0.3 part of pyridine whilst stirring. The mixture is kept at this temperature for 5½ hours whilst passing a slow stream of nitrogen or air through the reaction mixture for the duration of the condensation.

The mixture is allowed to cool to about 100° C. and is filtered whilst still hot. The product is washed with nitrobenzene and subsequently with methanol and dried in vacuo. The isolated dyestuff of the formula

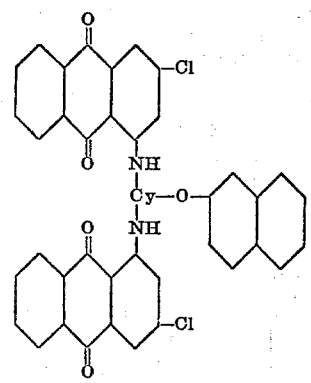

dyes cotton or viscose rayon or viscose staple fibre in accordance with the customary vat dyeing processes greenish-tinged yellow shades.

*Analytical results.*—Calculated (percent): C, 67.04; H, 2.88; Cl, 9.65. Found (percent): C, 67.1; H, 2.9; Cl, 9.8.

When instead of 1 - amino - 3 - chloro-anthraquinone, 2 - aminoacedianthrone, 4- or 5 - amino-1,1'-dianthrimide-carbazole or 4 - aminoanthraquinone - 2,1(N)-acridone is used, dyestuffs having similar properties are obtained.

EXAMPLE 2

6.3 parts of the reaction product of 1 mol of cyanuryl chloride and 2 mols of 1-amino-3-chloro-anthroquinone are reacted in 100 parts of nitrobenzene together with 2.9 parts of pentachlorothiophenol in the presence of 0.2 part of pyridine as in Example 1.

The mixture is kept for 1 hour at the boil and is subsequently allowed to cool to room temperature and stirred for a further 2 hours. The product of the formula

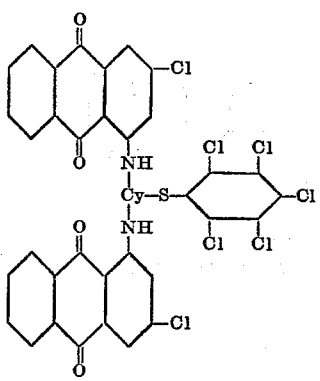

which precipitates is filtered, washed with nitrobenzene and methanol and dried in vacuo. It dyes cotton according to conventional vat dyeing processes greenish yellow shades.

Further, dyestuffs may be obtained as described in Example 1 by reacting the components listed in the following table.

| | Reactive component | Hydroxy or mercapto component | Color shade (on cotton) |
|---|---|---|---|
| 1 | Anthraquinone-Cl with NH-Cy-Cl-NH bridging two anthraquinone-Cl units | HO-⟨biphenyl⟩ | Greenish-tinged yellow. |
| 2 | Same as above | 2-isopropyl-5-methyl-phenol (HO with CH(CH$_3$)$_2$ and CH$_3$ substituents) | Do. |
| 3 | do | HO-⟨phenyl⟩-C(CH$_3$)$_3$ with additional HO (di-hydroxy tert-butyl phenol) | Do. |
| 4 | do | HO-⟨phenyl⟩ with CH$_3$, Cl, Cl substituents | Do. |
| 5 | do | HO-⟨phenyl⟩ with four Cl substituents | Do. |
| 6 | do | HO-⟨phenyl⟩-CH(CH$_3$)-⟨phenyl⟩ | Do. |
| 7 | Anthraquinone with NH-Cy-Cl-NH bridging two anthraquinone units | OH-⟨phenyl⟩-⟨phenyl⟩ | Yellow. |
| 8 | Same as above | HO-⟨biphenyl⟩ | Do. |
| 9 | do | HO-⟨phenyl⟩-NH-⟨phenyl⟩-CH$_3$ | Do. |
| 10 | do | HO-⟨phenyl⟩-CO$_2$CH$_2$CH$_2$CH$_3$ | Do. |
| 11 | do | HS-⟨phenyl⟩ with four Cl substituents | Do. |

TABLE—Continued
| | Reactive component | Hydroxy or mercapto component | Color shade (on cotton) |
|---|---|---|---|
| 12 | Same as Example 7 | 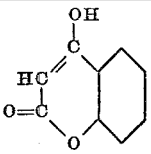 | Yellow. |
| 13 | ....do.... | 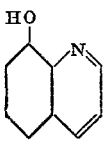 | Do. |
| 14 | ....do.... | 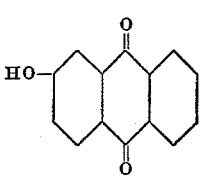 | Do. |
| 15 | ....do.... | 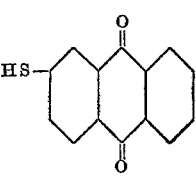 | Do. |
| 16 | 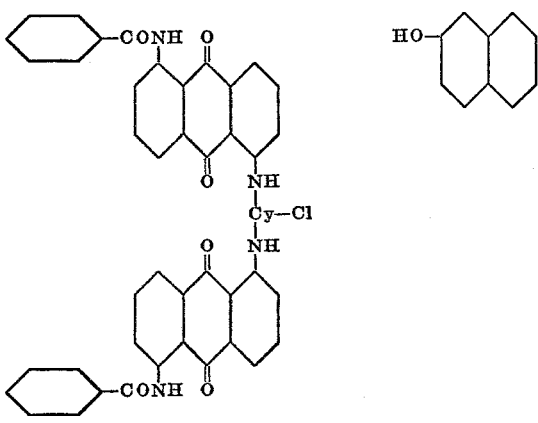 | 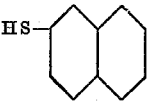 | Golden orange. |
| 17 | Same as above | 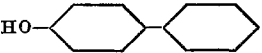 | Do. |
| 18 | ....do.... | 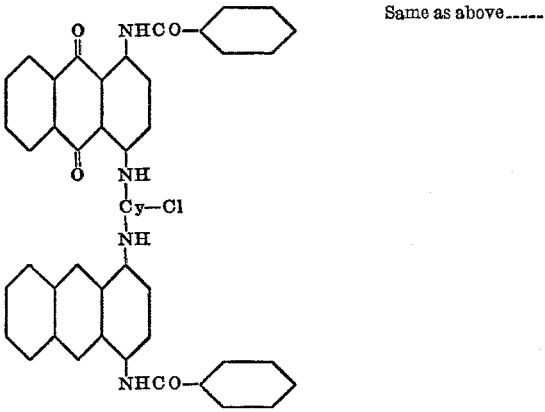 | Do. |
| 19 |  | Same as above | Red. |

TABLE—Continued

| | Reactive component | Hydroxy or mercapto component | Color shade (on cotton) |
|---|---|---|---|
| 20 | Same as Example 19 | Tetrachloro-hydroxy-benzene (HO–C₆Cl₄–H) | Red. |
| 21 | ...do... | 2,5-dimethyl-4-isopropyl-phenol | Red. |
| 22 | ...do... | 4-(2-hydroxy-2-propyl)-resorcinol | Red. |
| 23 | ...do... | 1-hydroxy-4-(p-toluenesulfonamido)anthraquinone | Red. |
| 24 | Bis-anthraquinone reactive component with Cy–Cl bridge | 4-hydroxybiphenyl | Blue. |
| 25 | Anthraquinone-Cy–Cl-anthraquinone reactive component (dichloro-substituted) | 2,6-dimethyl-3-isopropyl-4-chloro-phenol | Greenish-tinged yellow. |
| 26 | Same as above | 2-chloro-4-phenyl-phenol | Do. |

TABLE—Continued
| | Reactive component | Hydroxy or mercapto component | Color shade (on cotton) |
|---|---|---|---|
| 27 | 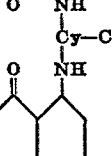 | 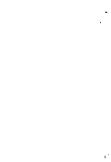 | Yellow. |
| 28 |  | 2 mol 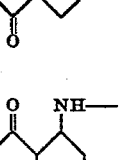 | Do. |
| 29 | Same as above | 1 mol 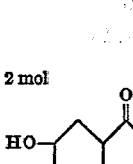<br>1 mol 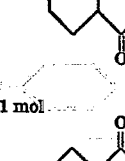<br> | Do. |
| 30 |  | | Red-orange. |
| 31 | 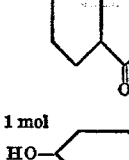 | Same as above | Greenish-tinged yellow. |
| 32 | Same as above | 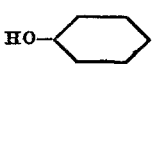 | Do. |

TABLE—Continued

| Reactive component | Hydroxy or mercapto component | Color shade (on cotton) |
|---|---|---|
| 33... Same as Example 31 | HO–⌬–Cl | Green-tinged yellow. |
| 34..... do | HO–⌬–OCH₃ | Do. |
| 35..... [bis-anthraquinone with NH–Cy–Cl NH bridge] | HO–⌬–COCH₃ | Yellow. |
| 36..... Same as above | HO–⌬–COOH | Do. |
| 37..... do | HO–⌬–Cl–⌬ (chloro-biphenyl) | Do. |
| 38..... do | [tricyclic hydroxy ketone structure] | Do. |
| 39..... [bis-anthraquinone with CONH groups and NH–Cy–Cl NH bridge] | HO–⌬(CH₃)–Cl, Cl | Golden orange. |
| 40..... Same as above | HO–⌬(Cl,Cl,Cl,Cl)–Cl (pentachloro) | Do. |
| 41..... do | HS–⌬(Cl,Cl,Cl,Cl)–Cl (pentachloro mercapto) | Do. |
| 42..... do | HO–⌬(Cl)–⌬ (chloro-biphenyl) | Do. |

TABLE—Continued

| | Reactive component | Hydroxy or mercapto component | Color shade (on cotton) |
|---|---|---|---|
| 43 | [anthraquinone-OCH₃ with NH–Cy–Cl linking two anthraquinone-OCH₃ units] | HO–C₆H₄–OCH₃ | Red-orange. |
| 44 | Same as above | 1-hydroxyanthraquinone (HO–anthraquinone) | Do. |
| 45 | ...do... | 1-mercaptoanthraquinone (HS–anthraquinone) | Do. |
| 46 | ...do... | HO–C₆H₄–COCH₃ | Do. |
| 47 | [anthraquinone with NH–Cy–Cl linking two anthraquinone units] | HO–C₆H₅ | Greenish-tinged yellow. |
| 48 | Same as above | HS–C₆H₅ | Do. |
| 49 | ...do... | HO–naphthyl | Do. |
| 50 | ...do... | HO–biphenyl | Do. |
| 51 | ...do... | HS–C₆Cl₅ (pentachlorothiophenol) | Do. |
| 52 | ...do... | HO–anthraquinone | Do. |

TABLE—Continued

| | Reactive component | Hydroxy or mercapto component | Color shade (on cotton) |
|---|---|---|---|
| 53 | [anthraquinone structure with NHCO-phenyl and NH-Cy-Cl linking two anthraquinone units with NHCO-phenyl] | 3-methyl-4,6-dichlorophenol (HO-, CH₃, Cl, Cl) | Red. |
| 54 | Same as above | biphenyl-2-ol (HO-phenyl-phenyl) | |
| 55 | ...do... | 2-chloro-4-phenylphenol (Cl, HO-phenyl-phenyl) | Red. |
| 56 | ...do... | 8-hydroxyquinoline (HO-quinoline) | Red. |
| 57 | ...do... | 4-hydroxycoumarin (HO-, O=, O, benzopyranone) | Red. |
| 58 | ...do... | 3-hydroxy-2-naphthanilide (OH, NHCO-phenyl on naphthalene) | Red. |
| 59 | [bis-anthraquinone structure with NH groups, Cy-Cl bridge, and additional NH-phenyl] | 2-hydroxynaphthalene (HO-naphthalene) | Blue. |

TABLE—Continued

| ent | Hydroxy or mercapto component | Color shade (on cotton) |
|---|---|---|
| 60.... Same as Example 59............. | tetrachloro-thiophenol (HS-C₆Cl₄) | Blue. |
| 61........do........ | 2-chloro-4-phenylphenol | Do. |
| 62........do........ | 1-mercaptoanthraquinone | Do. |
| 63........do........ | 4-hydroxybiphenyl | Do. |
| 64.... [bis-anthraquinone-amino-COOH with Cy—Cl bridge] | phenol (HO-C₆H₅) | Grey-blue. |
| 65.... [bis-anthraquinone-amino-COCH₃ with Cy—Cl bridge] | Same as above............. | Do. |
| 66.... [bis-anthraquinone-NH₂/oxazole structure with Cy—Cl bridge] | ....do............. | Do. |

EXAMPLE 3

5.6 parts of the reaction product of 1 mol of cyanuryl chloride and 2 mols of 1-aminoanthraquinone in 160 parts of nitrobenzene together with 1.4 parts of 4-hydroxybenzoic acid are reacted in the presence of 0.3 part of pyridine as in Example 1. After completion of the reaction the mixture is allowed to cool to 90° C., 2 parts of thionyl chloride are added and the whole is kept for 2 hours at this temperature. Thereafter excess thionyl chloride is removed by evaporation in vacuo and 2.3 parts of 1-aminoanthraquinone are added. The reaction mixture is stirred for 2 hours at 125–130° C. and subsequently for a further 1 hour at 155–160° C. It is then allowed to cool to about 100° C., filtered whilst still hot and the product isolated in the customary manner.

The resulting dyestuff of the formula

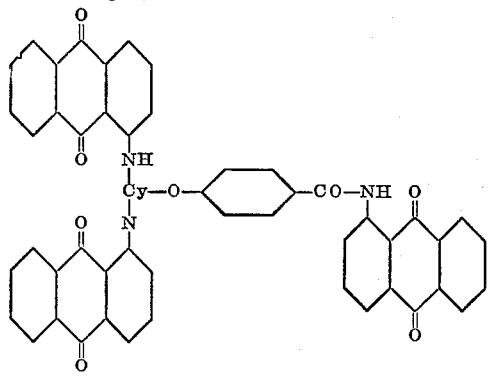

dyes cotton yellow shades having good fastness properties.

EXAMPLE 4

6.2 parts of the compound of the formula

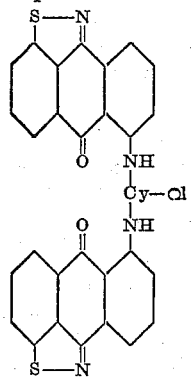

in 80 parts of nitrobenzene are heated to the boil with the addition of 1.5 parts of 2-naphthol and 0.3 part of pyridine, a slow stream of nitrogen being passed through until no further hydrochloric acid is evolved. The mixture is left to cool to about 80° C., filtered, the product washed with nitrobenzene, subsequently with methanol and then dried in vacuo at about 80° C.

The resulting dyestuff of the formula

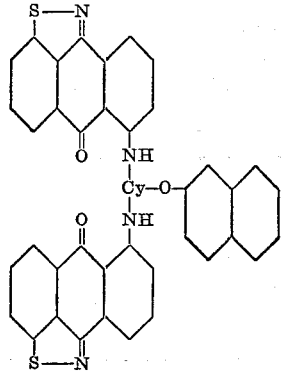

dyes polyvinyl chloride yellow shades having excellent fastness to migration.

When instead of 2-naphthol equivalent parts of 2-hydroxyanthraquinone are used, a yellow dyestuff having similar by good properties is obtained.

EXAMPLE 5

A mixture of 148 parts of cyanuryl chloride, 90 parts of 1-aminoanthraquinone and 960 parts of nitrobenzene is mixed with 93.5 parts of diethylaniline during one hour at 60° C. whilst stirring. After 22 hours' stirring at 65–70° C., the reaction product is filtered, washed with nitrobenzene, acetone, dilute hydrochloric acid, water, finally again with acetone, and dried. 143 parts (corresponding to 96% of theory) of a yellow product of the formula

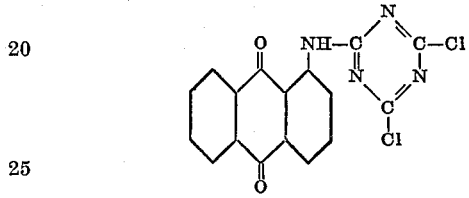

are obtained. It crystallizes from o-dichlorobenzene in large yellow plates.

37.1 parts of this product, 39.0 parts of 1-(2'-hydroxynaphthoyl-3')-aminobenzoyl-4-benzoylaminobenzene, 600 parts of nitrobenzene and 47 parts of diethylaniline are stirred for 17 hours at 120–125° C. The product is worked-up in the manner described above. 61.7 parts (86% of theory) of a reaction product of the formula

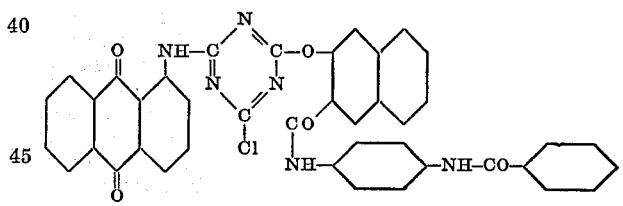

are obtained.

36 parts of the above product, 17 parts of 2-amino-3,4-phthaloylacridone and 300 parts of phenol are stirred for 3 hours at 150° C. The melt, cooled to 90° C., is mixed with 300 parts of pyridine. After cooling to room temperature, the dyestuff which has precipitated is filtered, washed with pyridine and methanol and dried. It corresponds to the formula

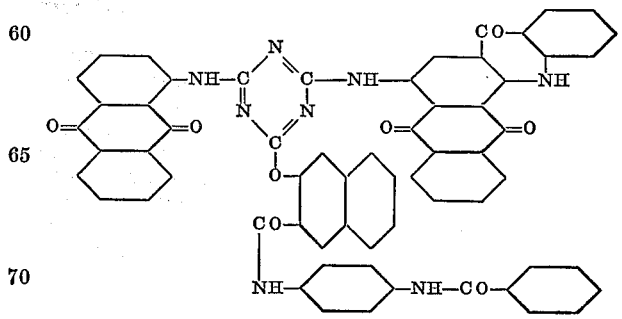

and dyes cotton from a claret-colored vat olive green shades.

EXAMPLE 6

The product of the formula

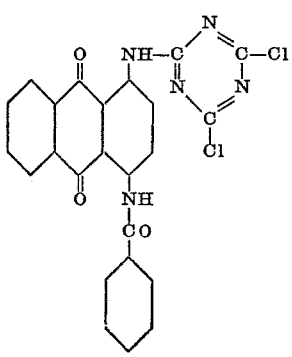

is obtained by reacting 74 parts of cyanuryl chloride with 68.4 parts of 1 - amino - 4 - benzoylaminoanthraquinone in 480 parts of nitrobenzene with the addition of 47 parts of diethylaniline in accordance with Example 5, paragraph 1.

9.8 parts of this product, 7.8 parts of 1 - (2' - hydroxynaphthoyl - 3') - amino - 4 - benzoylaminobenzene, 130 parts of nitrobenzene and 14 parts of diethylaniline are stirred for 17 hours at 120° C. The reaction product is isolated as indicated above. It corresponds to the formula

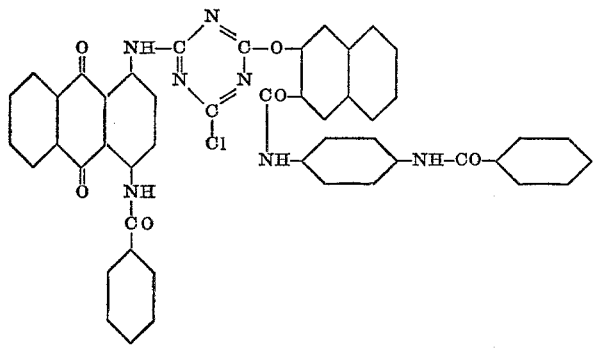

4.2 parts of this product are stirred for 3 hours at 150° C. with 1.4 parts of 1-aminoanthraquinone and 30 parts of phenol. The dyestuff which has been separated according to the method of Example 5 dyes cotton from a claret-colored vat covered orange-colored shades and corresponds to the formula

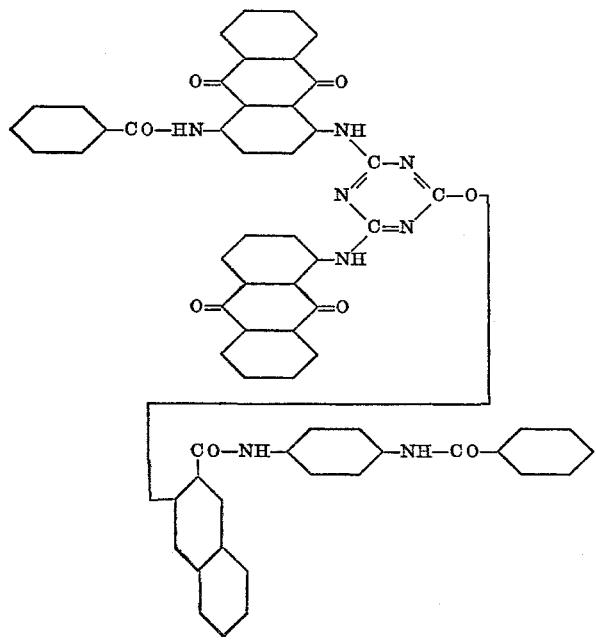

Dyeing instruction 1 part of dyestuff is vatted with 10 parts by volume of sodium hydroxide solution of 36° Bé. and 5 parts of sodium hydrosulphite in 200 parts of water at 50 to 70° C. The above stock vat is added to a dyebath which contains 5 parts by volume of sodium hydroxide solution of 36° Bé. and 3.7 parts of sodium hydrosulphite in 2000 parts of water. 100 parts of cotton are introduced at 40° C. After 10 minutes 15 parts of sodium chloride are added, a further 15 parts are added after 20 minutes, and dyeing is carried out at 40° C. for 45 minutes. The cotton is then squeezed out, oxidized and finished in the customary manner.

Pigment dyeing 5 parts of the dyestuff described in Example 2 are mixed with 95 parts of dioctyl phthalate and ground in a ball mill until the dyestuff particles are smaller than 3μ.

0.8 part of this dioctyl phthalate paste is mixed with 13 parts of polyvinyl chloride, 7 parts of dioctyl phthalate and 0.1 part of cadmium stearate. The mixture is then milled for 5 minutes on a two-roll mill at 140° C.

A material dyed greenish-tinged yellow, having good fastness to migration and good fastness to light, is obtained.

When instead of the dyestuff mentioned above, the dyestuff of Example 9 is used and in other respects the same procedure is followed, a material dyed greenish-yellow shades having good fastness to migration and good light fastness is obtained.

When instead of the abovementioned dyestuff the reaction products of Example 1, Table Examples 1, 40, 41 or 45 are used and in other respects the same procedure is followed, materials having similar by good fastness to migration and light are obtained.

Lacquer dyeing 40 parts of a nitrocellulose lacquer, 2.375 parts of titanium dioxide and 0.125 part of dyestuff No. 39 are ground for 16 hours in a rod mill. The resulting lacquer is spread in a thin layer on an aluminium foil. It gives an orange coloration of excellent fastness to light.

Orange or red lacquers having similar by good light fastness properties are obtained when using the dyestuffs according to Table Examples 41 or 55.

What is claimed is:

1. A vat dyestuff of the formula in which Y is —O— or —S— and R is
 diphenyl and diphenyl substituted by chlorine, phenyl and phenyl substituted by lower alkyl, hydroxyl, chloro, phenyl-substituted lower alkyl, lower alkylated phenylamino, nitro, methoxy, carboxyl, sulphonic acid, lower alkoxycarbonyl, and anthraquinoneaminocarbonyl,
 naphthyl and naphthyl substituted by phenylcarbonylamino, phenylcarbonylaminophenylaminocarbonyl, and carboxyl,
 benzopyronyl,
 quinolinyl, anthraquinonyl, anthraquinonyl substituted by lower alkyl sulphonamido, or
benzanthronyl.

2. A vat dyestuff of the formula

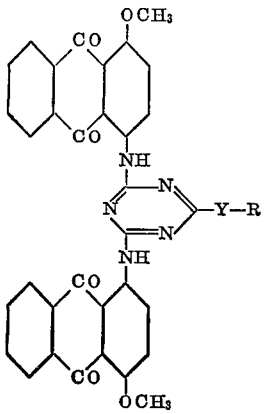

wherein Y is —O— or —S— and R is
  diphenyl and diphenyl substituted by chlorine,
  phenyl substituted by lower alkyl, hydroxyl, chloro, phenyl-substituted lower alkyl, lower alkylated phenylamino, nitro, methoxy, lower alkoxycarbonyl, and anthraquinoneaminocarbonyl,
  naphthyl substituted by phenylcarbonylamino, phenylcarbonylaminophenylaminocarbonyl, and carboxyl,
  benzopyronyl,
  quinolinyl,
  anthraquinonyl, anthraquinonyl substituted by lower alkyl sulphonamido, or
  benzanthronyl.

3. The vat dyestuff of the formula

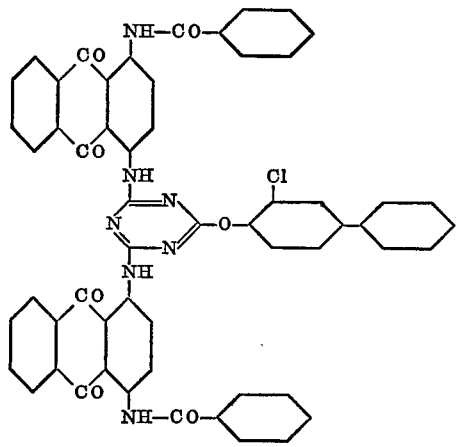

4. The vat dyestuff of the formula

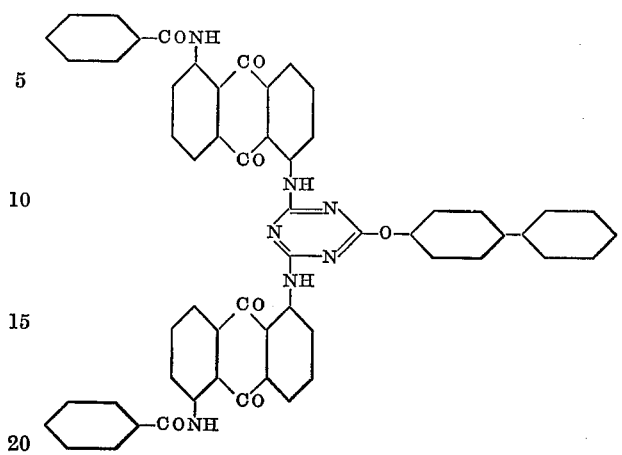

5. A vat dyestuff of the formula

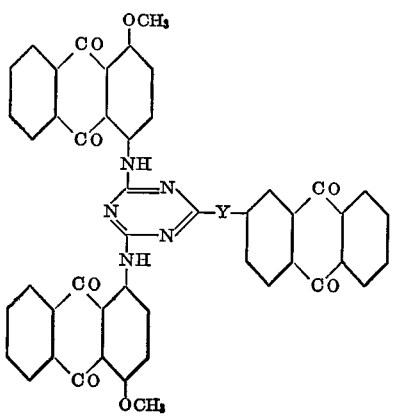

wherein Y is an oxygen or a sulphur atom.

References Cited
UNITED STATES PATENTS

| | | | |
|---|---|---|---|
| 2,716,645 | 8/1955 | Von | 260—249 |
| 3,164,593 | 1/1965 | Moergeli | 260—249 |
| 3,349,089 | 10/1967 | Kazankov et al. | 260—249 |

JOHN M. FORD, Primary Examiner

U.S. Cl. X.R.

8—34